May 7, 1968          S. KEMMLER          3,381,350

TWIN PRESSURE-ROLLER UNIT WITH BALL BEARINGS

Filed March 9, 1966

INVENTOR
SIGMUND KEMMLER

BY *Dicker + Craig*
ATTORNEYS

__United States Patent Office__

3,381,350
Patented May 7, 1968

3,381,350
TWIN PRESSURE-ROLLER UNIT WITH
BALL BEARINGS
Sigmund Kemmler, Schultheiss-Schneider-Strasse 36,
Geislingen, Steige, Germany
Filed Mar. 9, 1966, Ser. No. 532,980
Claims priority, application Germany, Mar. 10, 1965,
S 95,862
4 Claims. (Cl. 29—116)

ABSTRACT OF THE DISCLOSURE

A twin roller pressure unit for drawing or spinning machines or the like, in which the rollers are rotatably supported upon a common central shaft by ball bearings, wherein peripheral grooves on the shaft member serve as the inner guide for the ball bearings and a separate outer race member is provided in the form of a tubular extension which is fitted tightly over one end of a relatively stationary member which connects the two rollers, from which extension projects an integral portion which may be either curved or conically tapered so as to abut the ball bearings only at the outermost point thereof and to the side thereof facing the opposite roller. The abutting surface of the outer race member may preferably be in a concave configuration such that it has an osculating radius with the radius of the ball bearings. Additionally, a guide ring may be provided on the cylindrical connecting member, near the center thereof, which may be provided with a radial lubricating bore aligned with a corresponding bore in the connecting member.

The present invention relates to improvements in twin pressure rollers for drawing mechanisms of spinning machines or the like which form structural units and run on ball bearings, and in which the two roller bodies of each unit are rigidly secured to a common shaft which is provided with annular grooves forming the inner tracks for the bearing balls and extends loosely through a tubular connecting member between the two roller bodies which carries the outer races for the bearing balls and remains substantially stationary during the operation of the pressure rollers.

There are twin pressure-roller units known of the above mentioned type in which the common shaft of the roller bodies which are rigidly secured thereto is rotatably mounted by means of ball bearings within a tubular connecting member, and in which the outer races for the bearing balls are provided in the form of annular grooves of a cylindrical shape which are machined directly into the inner surface of the tubular connecting member near both ends thereof. For guiding the bearing balls in the axial direction within the tubular connecting member, a pair of caps of a thin material are fitted over the ends of the connecting member and form curved butting flanges on the bottom of the caps on which the balls engage in the direction toward the outer ends of the roller unit. This construction has the disadvantage that, because of the outer races in such a tubular connecting member, these members have to be made of a high-grade and expensive material which increases the cost of the twin pressure-roller units considerably, especially also since the two ends of each tubular member have to be made of a considerably larger diameter than its central part in order to allow for the required wall thickness of the outer races and possibly also because of the sealing flanges which have to be machined on both sides. Furthermore, this known bearing structure is very unsatisfactory since the thin caps cannot be made and fitted on the ends of the shaft with sufficient accuracy so as to form accurate butting surfaces for guiding the balls properly in the axial direction.

There is another known type of such twin pressure rollers which are mounted on roller bearings, in which separate caplike outer races of a thin material are flanged upon the inner wall of the tubular connecting member which consists of untempered steel, and in which the balls engage in the axial direction toward the ends of the rollers upon the inner curved surface of the bottom of each cap which forms the butting surface for guiding the balls in the axial direction. In this bearing structure it is very difficult to maintain the two butting surfaces for the balls in the caplike outer races at the proper distance from each other in accordance with the fixed distance between the inner tracks for the balls which are machined into the shaft. Furthermore, by flanging the cup-shaped outer races into the tubular connecting member, the required accuracy of these races for guiding the balls is seriously impaired. Finally, because of their particular shape, these tubular connecting members also require considerable machining.

It is an object of the present invention to provide a two pressure-roller unit which eliminates the above-mentioned disadvantages, is provided with high-duty ball bearings, and may be easily manufactured and assembled. According to the invention, this object is attained by providing the outer bearing race for each pressure roller with a butting shoulder for the bearing balls which faces toward the other pressure roller and with a tubular extension which is mounted on the connecting member which is provided in the form of a smooth cylindrical tube. Although these butting shoulders may in some cases be made of a conical shape, it is advisable for attaining the best possible running characteristics of the pressure rollers to make the butting shoulders of such a concave shape that they have an osculating radius in accordance with the radius of the balls. According to another feature of the invention, it is advisable to provide the extension of each outer bearing race with a sealing flange for the purpose of attaining a very small and uniform annular sealing gap between the bearing and each rotating roller body. The smooth tubular connecting member of the two pressure rollers may be provided in the same manner as the known connecting members with a central annular recess in its outer surface into which a holder for the roller unit engages which is mounted on the support of the drawing mechanism and guides the roller unit in the radial and axial directions. This annular recess may also serve as a point of engagement of a tool during the assembly or disassembly of the roller unit. A very advantageous means for guiding the pressure-roller unit which does not reduce the solidity of the tubular connecting member and may also be used for applying a suitable tool for the purpose of assembling and disassembling the unit consists according to a further feature of the invention of at least one guide ring which is secured on the smooth cylindrical connecting tube substantially at the center thereof. This ring is preferably provided with a radial lubricating bore which is in alignment with a corresponding radial bore in the connecting tube.

The features and advantages of the present invention will became more clearly apparent from the following detailed description thereof which is to be read with reference to be accompanying drawings, in which.

Figure 1:
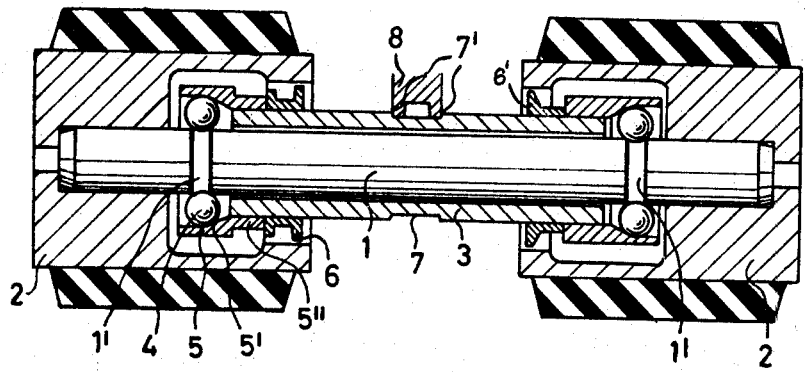
FIGURE 1 shows a longitudinal section of a twin-pressure roller unit according to the invention which is mounted on ball bearings, in which the outer race of the bearing of each roller is provided with a conical butting shoulder facing the other roller and with a separate sealing ring which abuts against the end surface of the tubular extension of the outer race.

As illustrated in FIGURE 1 of the drawings, the two roller bodies 2 of each twin-pressure roller unit are forced tightly upon the ends of the shaft 1 which passes freely through a smooth cylindrical tube 3 which forms the central connecting member between the two pressure rollers and is provided at both sides thereof with annular grooves 1' forming the inner tracks for the bearing balls 4. The outer races 5 of these bearings form separate elements and are provided with conical butting shoulders 5' on which the bearing balls 4 engage in the direction toward the center between the two roller bodies 2. These outer races 5 are provided with tubular extensions 5'' which are forced so far over the outer ends of the cylindrical tube 3 that a small bearing clearance remains in the axial direction. For sealing the bearings toward the outside, separate sealing rings 6 and 6' are tightly fitted on the cylindrical tube 3. These sealing rings 6 and 6' may be either of a U-shaped cross section, as shown in FIGURE 1 in the left pressure roller 6 or of an angular cross section, as shown in the right pressure roller 6'. The smooth cylindrical tube 3 forming the central connecting member between the two rollers has a sufficient wall thickness so as to permit a shallow annular groove 7 to be provided in its outer surface without being unduly weakened thereby. The lateral shoulders 7' of this groove 7 serve as lateral guide means for the holder 8 of the twin-pressure roller unit as indicated diagrammatically. This annular groove, together with the shoulders 7' may also be employed as surfaces on which tools may be applied when the pressure-roller unit is being assembled or disassembled.

Figure 2:
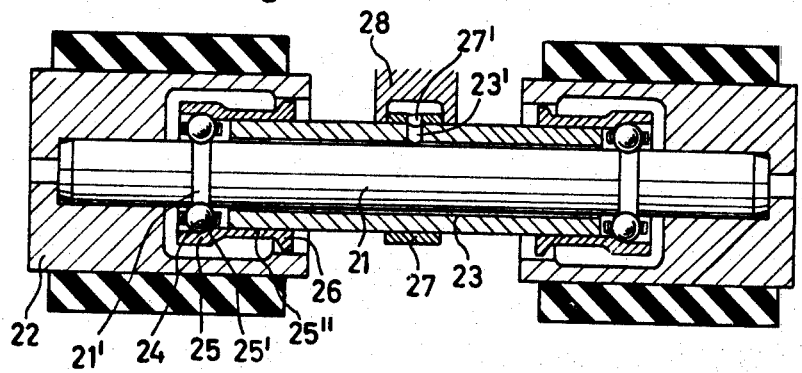
FIGURE 2 shows a longitudinal section of a twin-pressure roller unit similar to that according to FIGURE 1, but provided with outer bearing races which have concave butting shoulders and sealing rings which are integral with the outer races.
Figure 2A:
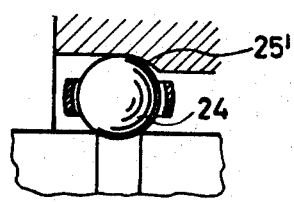
FIGURE 2a shows an enlarged view of a part of the ball bearing of one of the pressure rollers according to FIGURE 2.

FIGURE 2 shows a modification of the invention, in which the shaft 21 together with the roller bodies 22 are rotatably mounted on the balls 24 which run within the annular grooves 21' in shaft 21 and within the separate outer races 25. The butting shoulders 25' in the outer races 25 are made of a convex shape with an osculating radius which is only slightly larger than the radius of the balls 24 which abut against the butting shoulder in each pressure roller in the direction toward the other roller, as also shown in FIGURE 2a. The tubular extensions 25'' on the outer races 25 which are forced over the ends of cylindrical tube 23 are provided on their ends facing the holder 28 of the pressure rollers with sealing flanges 26. The center of the cylindrical tube 23 carries a guide ring 27 which is secured thereto by a force fit and is laterally guided by the holder 28. Guide ring 27 is mounted on tube 23 so that its radial bore 27' is in alignment with the bore 23' in tube 23. These bores 23' and 27' may be used as lubricating bores and also as stop shoulders for applying a tool when the pressure-roller unit is to be assembled or taken apart. In place of a single guide ring 27, it is also possible to mount a pair of such guide rings on the tube 23 to so engage with the outer sides of the holder 28. In this case it is advisable to provide at least one of these guide rings with a radial bore which is in alignment with a corresponding radial bore in tube 23.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A twin pressure-roller unit for a drawing mechanism of a spinning machine or the like, comprising a shaft, a pair of pressure rollers rigidly secured to both ends of said shaft and spaced from each other, a substantially cylindrical tubular connecting member surrounding and radially spaced from said shaft between said rollers and adapted to be held in a substantially stationary position during the rotation of said rollers and said shaft, at least one ball bearing for rotatably mounting each of said rollers and said shaft on said tubular connecting member, said shaft having at least one annular groove in its outer surface near each end thereof serving as an inner race for the balls of said bearing for each roller, and a separate outer race member for the ball bearings for each roller including a portion thereof which abuts the ball bearings only on the side thereof facing the other roller, and a tubular extension fitted tightly over one end of said connecting member.

2. A twin pressure-roller unit according to claim 1, wherein the portion of the outer race member which abuts the ball bearings is constructed in the form of a shoulder having an osculating radius substantially in accordance with the radius of said ball bearings.

3. A twin pressure-roller unit according to claim 1, further comprising a sealing flange on each of said tubular extensions.

4. A twin-pressure roller unit according to claim 1, further comprising at least one guide ring secured to the outer surface of said tubular connecting member substantially centrally thereof and having a radial bore, said connecting member also having at least one radial bore in alignment with said bore in said guide ring.

References Cited

UNITED STATES PATENTS

| | | | |
|---|---|---|---|
| 2,267,443 | 12/1941 | Cobb | 29—116 |
| 2,674,012 | 4/1954 | Noelting | 29—116 |
| 2,740,164 | 4/1956 | Schmid et al. | 29—116 |
| 2,867,006 | 1/1959 | Pray | 308—208 |
| 2,937,414 | 5/1960 | Cotchett | 29—116 |

FOREIGN PATENTS

| | | |
|---|---|---|
| 111,111 | 11/1928 | Austria. |
| 589,103 | 6/1947 | Great Britain. |
| 684,623 | 12/1952 | Great Britain. |
| 906,198 | 9/1962 | Great Britain. |

BILLY J. WILHITE, *Primary Examiner.*

UNITED STATES PATENT OFFICE
CERTIFICATE OF CORRECTION

Patent No. 3,381,350                                  May 7, 1968

Sigmund Kemmler

It is certified that error appears in the above identified patent and that said Letters Patent are hereby corrected as shown below:

In the heading to the printed specification, lines 4 and 5, cancel "Schultheiss-Schneider-Strasse 36, Geislingen, Steige, Germany" and insert -- Geislingen, Steige, Germany, assignor to Spindelfabrik Suessen, Schurr, Stohlecker & Grill G.m.b.H., Suessen, Wuerttemburg, Germany --.

Signed and sealed this 9th day of September 1969.

(SEAL)
Attest:

Edward M. Fletcher, Jr.                        WILLIAM E. SCHUYLER, JR.

Attesting Officer                                Commissioner of Patents